US007454288B2

(12) United States Patent
Parikh et al.

(10) Patent No.: US 7,454,288 B2
(45) Date of Patent: Nov. 18, 2008

(54) SYSTEM AND METHOD FOR CLUSTERING PROBE VEHICLES FOR REAL-TIME TRAFFIC APPLICATION

(75) Inventors: Jayendra S. Parikh, Bloomfield Hills, MI (US); Hariharan Krishnan, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 431 days.

(21) Appl. No.: 11/194,133

(22) Filed: Jul. 29, 2005

(65) Prior Publication Data

US 2007/0027610 A1 Feb. 1, 2007

(51) Int. Cl.
*G06F 19/00* (2006.01)
*G08G 1/00* (2006.01)

(52) U.S. Cl. ...................................... 701/117; 701/119

(58) Field of Classification Search ....................... None
See application file for complete search history.

(56) References Cited

U.S. PATENT DOCUMENTS 6,804,602 B2 10/2004 Impson et al. .............. 701/117
7,246,007 B2 * 7/2007 Ferman ...................... 701/200
2002/0059017 A1 * 5/2002 Yamane et al. ................. 701/1
2004/0230345 A1 11/2004 Tzamaloukas ................. 701/1
2005/0165886 A1 7/2005 Tuer et al. ................... 709/203

FOREIGN PATENT DOCUMENTS

JP 2003-272095 * 9/2003

* cited by examiner

*Primary Examiner*—Michael J. Zanelli

(57) ABSTRACT

A system and method for forming a cluster of probe vehicles, aggregating and processing (e.g., averaging) data generated by the members of the cluster, and reporting only the processed data to a receiving center, such as a Traffic Management Center, thereby reducing the number of simultaneous communication channels required to report the data and reducing the amount of data which must be processed in real-time at the receiving center. Broadly, each cluster identifies one member to which all other members report. The identified member receives the individual reports, aggregates and processes the data, and then transmits it to the receiving center for further processing.

16 Claims, 3 Drawing Sheets

FIG. 3
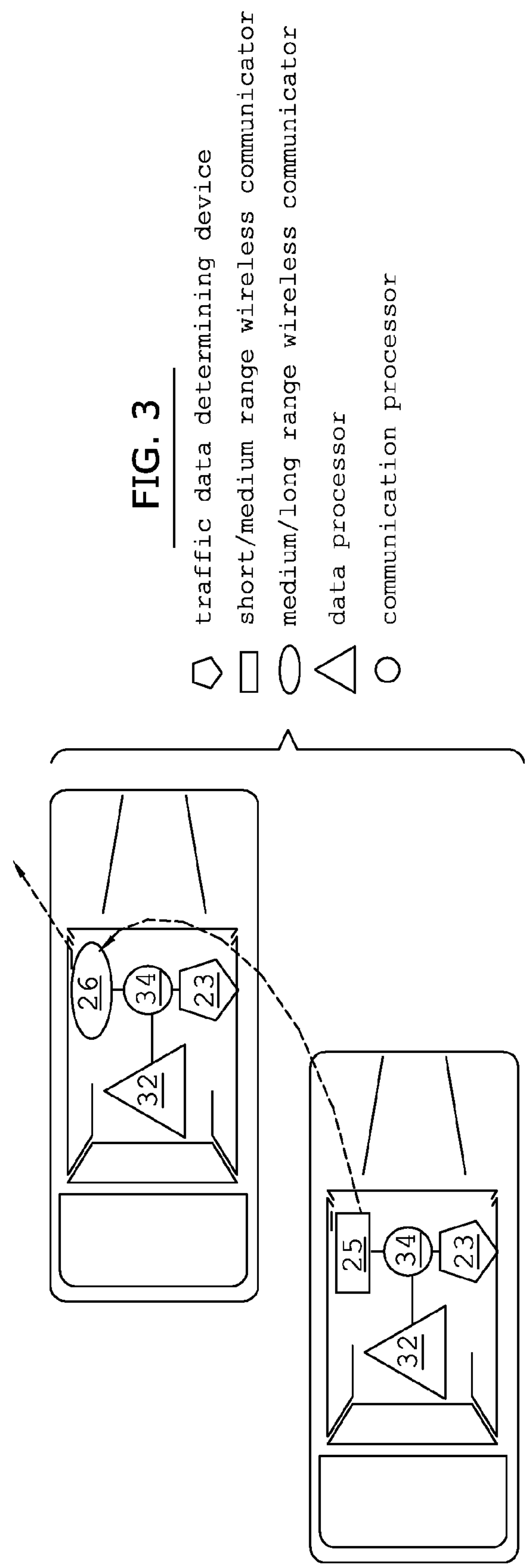
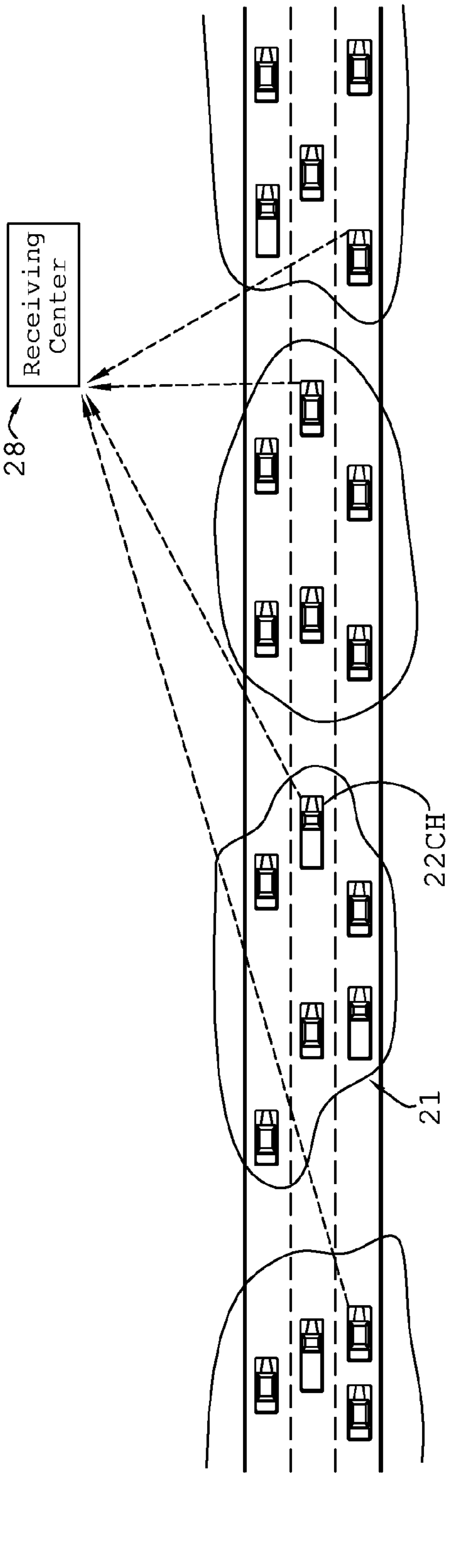
FIG. 5

SYSTEM AND METHOD FOR CLUSTERING PROBE VEHICLES FOR REAL-TIME TRAFFIC APPLICATION

TECHNICAL FIELD

The present invention relates to systems and methods for collecting traffic data using probe vehicles. More specifically, the present invention concerns a system and method for forming a cluster of probe vehicles, aggregating and processing (e.g., averaging) data generated by the members of the cluster, and reporting only the processed data to a receiving center, such as a Traffic Management Center, thereby reducing the number of simultaneous communication channels required to report the data and reducing the amount of data which must be processed in real-time at the receiving center location.

BACKGROUND OF THE INVENTION

It is known in the prior art to use vehicles as probes for measuring traffic conditions in real-time. Individual vehicles provide "floating car data", such as, for example, the vehicle's time, speed, position, and heading, which can be used to estimate travel time and traffic speed, and which can in turn be used as an online indicator of road network status, as a basis for detecting incidents, or as input for a dynamic route guidance system.

With reference to FIG. 1 (PRIOR ART), an exemplary prior art probe vehicle system 10 includes a plurality of probe vehicles 12; technology 14 for determining each probe vehicle's location, such as, for example, a system using orbiting satellites, such as the Global Positioning System (GPS), a system using cellular telephones, or a system using radio-frequency identification (RFID); and a wireless communication system 16 for allowing communication between the probe vehicles and a receiving center 18 which receives and processes the data generated by the probe vehicles 12.

There have been few systematic efforts using a general approach to determine the required number of probe vehicles 12 to reliably and adequately measure link-travel time for different road networks. Using traffic simulation methods, different studies have provided widely varying estimates of the number of probe vehicles 12 needed. These studies indicate that, on a freeway, 5% to 7% of the vehicles present must be probe vehicles 12 providing data in order to determine real-time traffic conditions with a sufficiently high level of confidence. In such a scenario, an exceedingly large number of probe vehicles 12 would each communicate frequently with the receiving center 18 in order to provide a relatively small amount of data. An exceedingly large number of communication channels, potentially one for each probe vehicle 12, would be needed to accommodate the frequent data communication. Furthermore, an exceedingly substantial data processing capacity would be needed at the receiving center 18 to process the large volume of incoming data in real-time.

SUMMARY OF THE INVENTION

The present invention provides a system and method allowing for forming a cluster of probe vehicles, aggregating and processing (e.g., averaging) data generated by the members of the cluster, and reporting only the processed data to a receiving center, such as a Traffic Management Center, thereby reducing the number of simultaneous communication channels required to report the data to the receiving center and reducing the amount of data which must be processed in real-time at the receiving center. Broadly, each cluster identifies one member to which all other members report. The identified member receives the individual reports, aggregates and processes the data, and then transmits it to the receiving center for further processing.

Initially, at least two probe vehicles use short-range wireless communication to exchange information and form a cluster. The cluster members exchange pre-defined messages to establish one as the cluster head. Thereafter, additional probe vehicles exchange pre-defined messages with the cluster head and are allowed to join the cluster so long as the maximum number of members has not been reached. If the maximum number of members has been reached, then the excess probe vehicle is not allowed to join the cluster and must either find another cluster to join or find another unaffiliated probe vehicle with which to start a new cluster. If a member moves out of direct communication range (without intermediate hop or relay) with the cluster head, then communication from that member is relayed by another member to the cluster head. The cluster head performs a number of functions, including, for example, maintaining a list of current cluster members; limiting the cluster to a maximum number of members; receiving time, speed, position, heading, and other data from each member at a pre-defined interval; aggregating and processing the received data; and transmitting the processed data to the receiving center. When a probe vehicle leaves the cluster, it notifies the cluster head and the cluster head updates its list of members. When the cluster head leaves the cluster, it announces its departure to all other members, and the remaining members then exchange pre-defined messages to select a new cluster head from among their number.

Thus, it will be appreciated and understood that the system and method of the present invention provide a number of improvements and advantages over the prior art, including for example, reducing the number of simultaneous communication channels required to report probe vehicle data to the receiving center and reducing the amount of such data which must be processed in real-time at the receiving center.

These and other features of the present invention are discussed in greater detail in the section below titled DESCRIPTION OF THE PREFFERED EMBODIMENT(S).

BRIEF DESCRIPTION OF THE DRAWINGS

A preferred embodiment of the present invention is described in detail below with reference to the attached drawing figures, wherein:

FIG. 3 is a depiction of two cluster members, one of which is a cluster head, which form part of the system shown in FIG. 2;

FIG. 5 is a depiction of the preferred embodiment of the system of the present invention, wherein a plurality of clusters have been formed, with the cluster head of each such cluster reporting its aggregated and processed local traffic data to the receiving center.

DESCRIPTION OF THE PREFERRED EMBODIMENT(S)

With reference to FIGS. 2-5, a system and method is herein described and otherwise disclosed in accordance with a preferred embodiment of the present invention. Broadly, the system and method allow for forming a cluster of probe vehicles, aggregating and processing (e.g., averaging) data generated by the members of the cluster, and reporting only the processed data to a receiving center, such as a Traffic Management Center, thereby reducing the number of simultaneous communication channels required to report the data to the receiving center and reducing the amount of data which must be processed in real-time at the receiving center. Broadly, each cluster identifies one member to which all other members report. The identified member receives the individual reports, aggregates and processes the data, and then transmits it to the receiving center for further processing.

Figure 1:
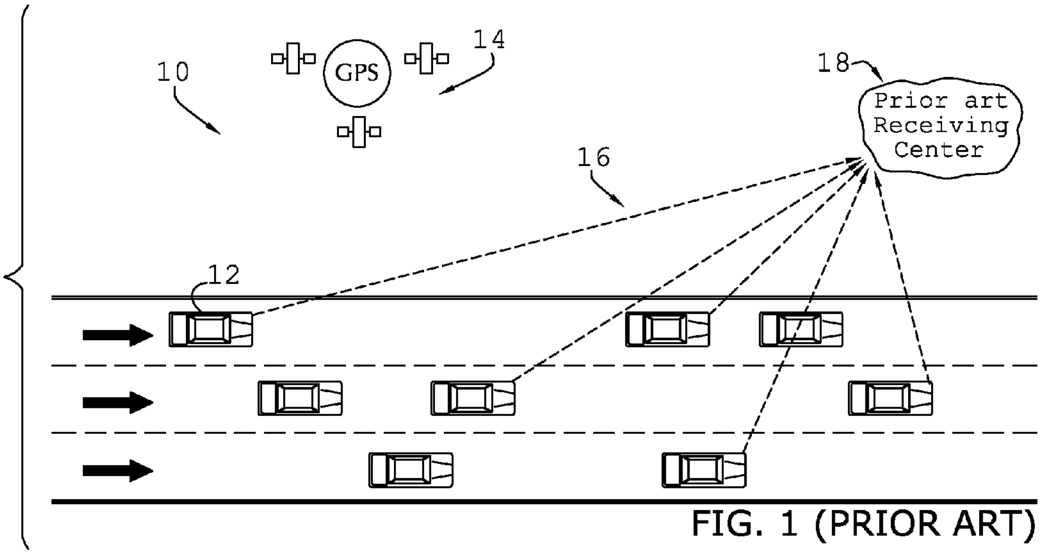
FIG. 1 (PRIOR ART)
FIG. 1 (PRIOR ART) is a depiction of a prior art system for collecting traffic data using probe vehicles, wherein each of a plurality of probe vehicles operates substantially independently and separately reports its local traffic data to a receiving center.
Figure 2:
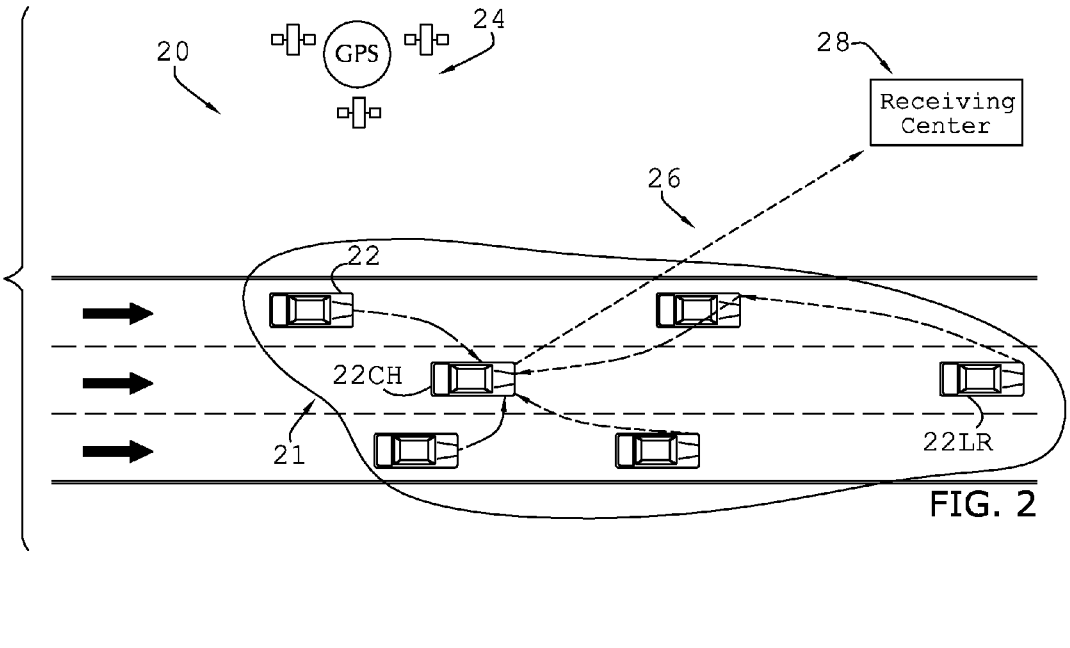
FIG. 2 is a depiction of a preferred embodiment of the system of the present invention for collecting data using probe vehicles, wherein the probe vehicles form clusters, each cluster member reports its local traffic data to a cluster head, and the cluster head reports the aggregated and processed local traffic data to the receiving center.

More specifically, referring to FIGS. 2 and 3, the system 20 of the present invention comprises a plurality of probe vehicles 22 forming a cluster 21, wherein each probe vehicle 22 includes traffic data determining devices, including a device 23 using technology 24 for determining the probe vehicle's location, such as, for example, a system using orbiting satellites, such as the Global Positioning System (GPS), a system using cellular telephones, or a system using radio-frequency identification (RFID). Each probe vehicle 22 further includes a wireless communicator 25, such as, for example, a Dedicated Short Range Communication (DSRC) device, adapted and operable to at least allow for short-range wireless communication with other probe vehicles 22. In addition, at least one of the probe vehicles 22CH (hereinafter referred to as the "cluster head") includes a wireless communicator 26, such as, for example, a cellular device, adapted and operable to at least allow for medium- to long-range communications with the receiving center 28. In one contemplated implementation, any probe vehicle can be selected to be the cluster head, in which case it is preferable that the short-range wireless communication capability and the medium- to long-range wireless communication capability both be provided in a single wireless communicator, though, possibly, the medium- to long-range communication capability of the single wireless communicator may only be enabled when and while the probe vehicle is identified as the cluster head and disabled at all other times. In another contemplated implementation, only certain probe vehicles can be selected to be the cluster head, in which case only those certain probe vehicles may be provided with the aforementioned single combined wireless communicator. In yet another contemplated implementation, those probe vehicles eligible to be selected as the cluster head may vary, in which case the aforementioned short-range wireless communicator may be substantially permanently installed in each probe vehicle while the aforementioned medium- to long-range wireless communicator may be substantially removably installed in certain probe vehicles so that when, for example, those certain probe vehicles are temporarily taken out of service for maintenance, the long-range wireless communicator can be removed and installed into other probe vehicles. Additional implementations are possible.

Each probe vehicle 22 further includes a data processor 32 and a communication processor 34. The data processor 32 is adapted and operable to gather or otherwise obtain the traffic data, such as for example, time, speed, location (e.g., latitude and longitude), and heading data for the probe vehicle 22 from the traffic data determining devices for subsequent communication to the cluster head 22CH. In the cluster head 22CH, the data processor 32 is also operable to aggregate and process, e.g., average, the traffic data received from the various cluster members 22. The communication processor 34 is adapted and operable to facilitate interaction with other probe vehicles 22, such as when establishing a cluster head 22CH and when communicating with the cluster head 22CH. In the cluster head 22CH, the communication processor 34 is also operable to facilitate interaction with the receiving center 28. The communication processor 34 is provided with a pre-defined message protocol for accomplishing these and other functions relating to operation of the present invention. For example, the message protocol allows for and facilitates the joining and leaving of individual probe vehicles 22 from the cluster 21. The message protocol also allows for and facilitates selecting or identifying a cluster head 22CH for receiving the other members' data for aggregation and processing. The message protocol also allows for and facilitates cluster members 22 relaying communication by other cluster members 22LR to the cluster head 22CH when those other members 22LR are not within the direct communication range allowed for by the short-range wireless communicator 25. Implementation of the data processor 32 and communication processor 34, and particularly the message protocol, can involve substantially conventional techniques and is therefore within the ability of one with ordinary skill in the art without requiring undue experimentation.

Figure 4:
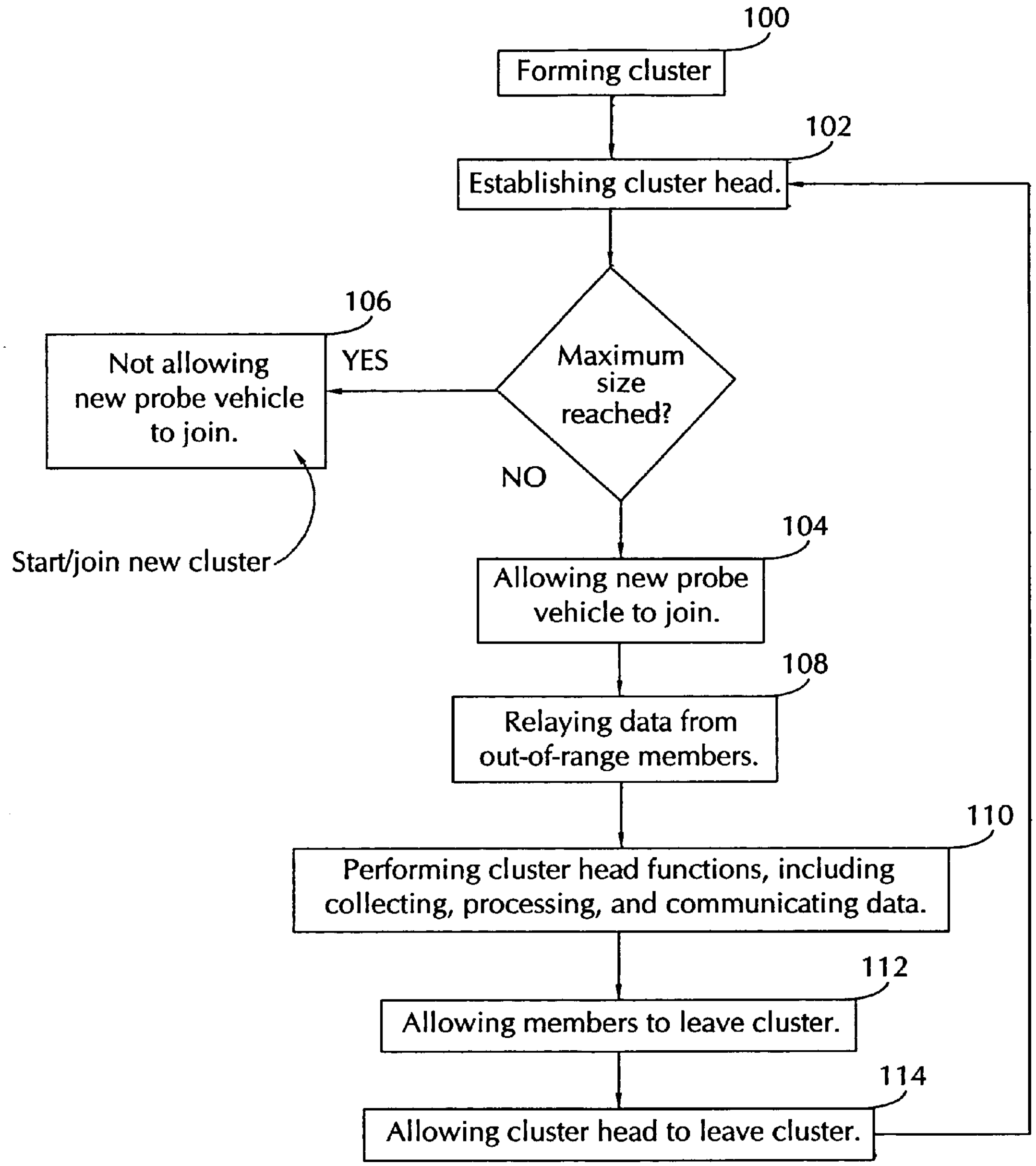
FIG. 4 is a flowchart of steps involved in practicing a preferred embodiment of the method of the present invention.

In exemplary but non-limiting use and operation, the present invention may be implemented to function as follows. Referring to FIG. 4, at least two probe vehicles 22 use short-range wireless communication to exchange information and form a cluster 21, as indicated by box 100. The cluster members 22 exchange pre-defined messages to establish one as the cluster head 22CH, as indicated by box 102. Thereafter, additional probe vehicles 22 exchange pre-defined messages with the cluster head 22CH and are allowed to join the cluster 21 so long as a pre-established maximum number of members (six, for example) has not been reached, as indicated by box 104. If the maximum number of members has been reached, then the excess probe vehicle is not allowed to join the cluster 21 and must either find another cluster to join or find another unaffiliated probe vehicle with which to start a new cluster, as indicated by box 106. If a member 22LR moves out of direct communication range (without intermediate hop or relay) with the cluster head 22CH, then communication from that member 22LR is relayed by another member 22 to the cluster head 22CH, as indicated by box 108. The cluster head 22CH performs a number of functions, including, for example, maintaining a list of current cluster members 22; limiting the cluster 21 to a maximum number of members; receiving time, speed, position, heading and other data from each member 22 at a pre-defined interval; aggregating and processing the received data; and communicating the processed data to the receiving center 28, as indicated by box 110. When a probe vehicle 22 leaves the cluster 21, it notifies the cluster head 22CH and the cluster head 22CH updates its list of members, as indicated by box 112. When the cluster head 22CH leaves the cluster 21, it announces its departure to all other members 22, as indicated by box 114, and the remaining members 22 then exchange pre-defined messages to select a new cluster head from among their number, as indicated by box 102.

Referring to FIG. 5, multiple clusters 21 may be formed, with the cluster head 22CH of each such cluster 21 communicating the aggregated and processed data generated by the cluster 21 to the receiving center 28.

From the preceding discussion, it will be appreciated and understood that the system and method of the present invention provide a number of improvements and advantages over the prior art, including for example, reducing the number of simultaneous communication channels required to report probe vehicle data to the receiving center and reducing the amount of such data which must be processed in real-time at the receiving center.

Although the present invention has been described with reference to the preferred embodiments illustrated in the drawings, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of collecting traffic data, the method comprising the steps of:
- (a) forming a cluster of at least two probe vehicles, wherein each probe vehicle is operable to collect traffic data;
- (b) establishing one of the probe vehicles as a cluster head;
- (c) for each probe vehicle in the cluster, collecting traffic data and communicating the traffic data at least periodically to the cluster head;
- (d) processing the traffic data at the cluster head; and
- (e) communicating the processed traffic data from the cluster head to a receiving center.

2. The method as set forth in claim 1, wherein the traffic data includes, for each probe vehicle, at least a current time, a current location, a current speed, and a current heading.

3. The method as set forth in claim 1, wherein the probe vehicles communicate with the cluster head using short-range communication.

4. The method as set forth in claim 1, wherein processing the traffic data at the cluster head includes aggregating and averaging the traffic data.

5. The method as set forth in claim 1, wherein the receiving center is a traffic management center.

6. The method as set forth in claim 1, further including the step of allowing additional probe vehicles to join the cluster.

7. The method as set forth in claim 6, wherein the additional probe vehicles are allowed to join the cluster only so long as a pre-established maximum number of cluster members has not been reached.

8. The method as set forth in claim 1, further including the step of allowing probe vehicles to leave the cluster.

9. The method as set forth in claim 1, further including the step of for any probe vehicle in the cluster but not within communication range with the cluster head, relaying that probe vehicle's collected and communicated traffic data through another probe vehicle to the cluster head.

10. The method as set forth in claim 1, further including the step of if the cluster head indicates that it is leaving the cluster, establishing one of the remaining probe vehicles as a new cluster head.

11. A system implementing the method as set forth in claim 1.

12. A method of collecting traffic data, the method comprising the steps of:
- (a) forming a cluster of at least two probe vehicles, wherein each probe vehicle is operable to collect traffic data;
- (b) establishing one of the probe vehicles as a cluster head;
- (c) allowing additional probe vehicles to join the cluster;
- (d) for each probe vehicle, collecting traffic data and communicating the traffic data at least periodically to the cluster head using short-range communication;
- (e) for any probe vehicle not within communication range with the cluster head, relaying that probe vehicle's collected and communicated traffic data through another probe vehicle to the cluster head;
- (f) aggregating and averaging the traffic data at the cluster head;
- (g) communicating the aggregated and averaged traffic data from the cluster head to a receiving center; and
- (h) if the cluster head indicates that it is leaving the cluster, establishing one of the remaining probe vehicles as a new cluster head.

13. The method as set forth in claim 12, wherein the additional probe vehicles are allowed to join the cluster only so long as a pre-established maximum number of cluster members has not been reached.

14. The method as set forth in claim 12, wherein the traffic data includes, for each probe vehicle, at least a current time, a current location, a current speed, and a current heading.

15. The method as set forth in claim 12, wherein the receiving center is a traffic management center.

16. A system implementing the method as set forth in claim 12.

* * * * *